(12) United States Patent
Yu

(10) Patent No.: US 10,491,707 B2
(45) Date of Patent: Nov. 26, 2019

(54) INFORMATION PROCESSING USING A SERVER GROUP

(71) Applicant: Alibaba Group Holding Limited, George Town (KY)

(72) Inventor: Junze Yu, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 191 days.

(21) Appl. No.: 15/833,907

(22) Filed: Dec. 6, 2017

(65) Prior Publication Data

US 2018/0109647 A1  Apr. 19, 2018

Related U.S. Application Data

(63) Continuation of application No. PCT/CN2016/084225, filed on Jun. 1, 2016.

(30) Foreign Application Priority Data

Jun. 8, 2015  (CN) .......................... 2015 1 0309180

(51) Int. Cl.
*G06F 15/16* (2006.01)
*H04L 29/08* (2006.01)
(Continued)

(52) U.S. Cl.
CPC .......... *H04L 67/32* (2013.01); *H04L 67/1008* (2013.01); *H04L 67/1012* (2013.01);
(Continued)

(58) Field of Classification Search
CPC . H04L 67/32; H04L 67/1008; H04L 67/1012; H04L 67/1021; G06F 16/9537; G06F 16/2282
See application file for complete search history.

(56) References Cited

U.S. PATENT DOCUMENTS 5,742,598 A * 4/1998 Dunn ................ H04L 29/12113
370/393
6,502,125 B1  12/2002 Kenner et al.
(Continued)

FOREIGN PATENT DOCUMENTS

CN  1367439   9/2002
CN  103544153  1/2014
(Continued)

OTHER PUBLICATIONS

International Search Report issued by the International Searching Authority in International Application No. PCT/CN2016/084225 dated Aug. 31, 2016; 8 pages.
(Continued)

*Primary Examiner* — Richard G Keehn
(74) *Attorney, Agent, or Firm* — Fish & Richardson P.C.

(57) ABSTRACT

An acquisition request, received at a server, for acquiring activity information of an activity account includes location information of a terminal, an activity identifier, and a target quantity of the activity information. The server is in a server group. Each server is located at a different location and separately stores activity information. A determination is made whether a quantity of locally stored activity information meets the target quantity of the acquisition request. The target quantity of activity information is locally acquired and sent to the terminal. A second server is selected when the quantity does not meet the target quantity. The acquisition request is sent to the second server, such that the second server repeats the process. The second server is nearest to the terminal from among other servers in the server group that did not receive the request.

20 Claims, 5 Drawing Sheets

(51) Int. Cl.
*G06F 16/22* (2019.01)
*G06F 16/9537* (2019.01)

(52) U.S. Cl.
CPC ...... *H04L 67/1021* (2013.01); *G06F 16/2282* (2019.01); *G06F 16/9537* (2019.01)

(56) References Cited

U.S. PATENT DOCUMENTS

| | | | | |
|---|---|---|---|---|
| 2002/0038360 | A1* | 3/2002 | Andrews | H04L 29/12066 709/223 |
| 2002/0046405 | A1* | 4/2002 | Lahr | H04L 29/06027 725/87 |
| 2007/0028289 | A1* | 2/2007 | Koshino | H04N 7/17318 725/136 |
| 2007/0288480 | A1* | 12/2007 | Caplan | G06F 16/9535 |
| 2008/0218312 | A1* | 9/2008 | Asher | G06K 19/07762 340/10.1 |
| 2011/0238641 | A1* | 9/2011 | Labuda | H04B 17/318 707/703 |
| 2013/0103977 | A1* | 4/2013 | Zimmermann | G06F 11/0751 714/4.11 |
| 2013/0166622 | A1* | 6/2013 | Arunachalam | H04L 67/1021 709/202 |
| 2014/0095925 | A1* | 4/2014 | Wilson | G06F 11/1425 714/4.12 |
| 2014/0119337 | A1* | 5/2014 | Peng | H04W 36/08 370/331 |
| 2014/0196038 | A1 | 7/2014 | Kottomtharayil et al. | |
| 2015/0088876 | A1* | 3/2015 | Morimoto | G06Q 50/18 707/728 |
| 2015/0156460 | A1* | 6/2015 | Szybalski | G06K 9/00476 348/143 |
| 2015/0350299 | A1* | 12/2015 | Pineas | G06F 16/16 709/203 |
| 2016/0065660 | A1* | 3/2016 | Miyata | H04L 67/1029 709/223 |
| 2016/0124930 | A1* | 5/2016 | Dhawan | G06F 17/243 715/224 |
| 2016/0342497 | A1* | 11/2016 | Kempster | G06F 11/3433 |
| 2017/0147596 | A1* | 5/2017 | Yang | G06F 16/9574 |

FOREIGN PATENT DOCUMENTS

| | | |
|---|---|---|
| CN | 103678697 | 3/2014 |
| CN | 103716251 | 4/2014 |
| CN | 103825835 | 5/2014 |
| CN | 103838855 | 6/2014 |
| CN | 104077302 | 10/2014 |
| CN | 104363300 | 2/2015 |
| CN | 104636957 | 5/2015 |
| EP | 1053524 | 11/2000 |
| EP | 1061710 | 12/2000 |

OTHER PUBLICATIONS

European Extended Search Report in European Application No. 16806737.9, dated Dec. 5, 2018, 11 pages.
International Preliminary Report on Patentability in International Application No. PCT/CN2016/084225, dated Dec. 12, 2017, 11 pages (with English Translation).

\* cited by examiner

INFORMATION PROCESSING USING A SERVER GROUP

This application is a continuation of PCT Application No. PCT/CN2016/084225, filed on Jun. 1, 2016, which claims priority to Chinese Patent Application No. 201510309180.6, filed on Jun. 8, 2015, and each application is incorporated by reference in its entirety.

BACKGROUND

The present disclosure relates to the field of Internet technologies. With the rapid development of Internet technologies, interaction in a digital electronic manner has become increasingly popular. During an interaction, for example, numerous users may access the same account simultaneously (such as, if the account is a popular account).

In some situations, numerous users may simultaneously send requests to a server for acquiring activity information of an activity account including multiple pieces of activity information. In this case, the number of the requests received by the server within a time period may be greater than the number of requests that the server is capable of processing. As a result, the speed at which the server responds to requests sent by some users may be reduced, thus lowering response efficiency. In some cases, the server may not be able to respond to requests sent by some users.

SUMMARY

The present disclosure describes the use of a server group for information processing.

In an implementation, an acquisition request is received at a server, from a terminal. The acquisition request is for acquiring activity information of an activity account. The acquisition request includes location information of the terminal, an activity identifier of the activity account, and a target quantity of the activity information to be acquired. The server is one server in a server group, and each server in the server group is located at a different location. Each server separately stores activity information of the activity account. A determination is made at the server whether a quantity of locally stored activity information of the activity account corresponding to the activity identifier meets the target quantity by being greater than, or equal to, the target quantity of the activity information to be acquired by the acquisition request. For example, the server that receives the acquisition request can determine if an amount of red envelopes is stored on the server. The target quantity of activity information is locally acquired, at the server, when the quantity meets the target quantity, and the acquired target quantity of activity information is sent to the terminal. Using the location information of the terminal, a second server is selected when the quantity does not meet the target quantity, and the acquisition request is sent to the second server. The second server repeats, according to the acquisition request, the steps of receiving the request, determining whether a local quantity meets the target quantity, and locally acquiring the target quantity or selecting a third server. The third server that is selected is the server that is nearest to the terminal from among other servers in the server group that did not receive the request. The selected server receives and processes the acquisition request.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the speed at which the server responds to requests sent by users can be accelerated. Second, response efficiency is improved. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
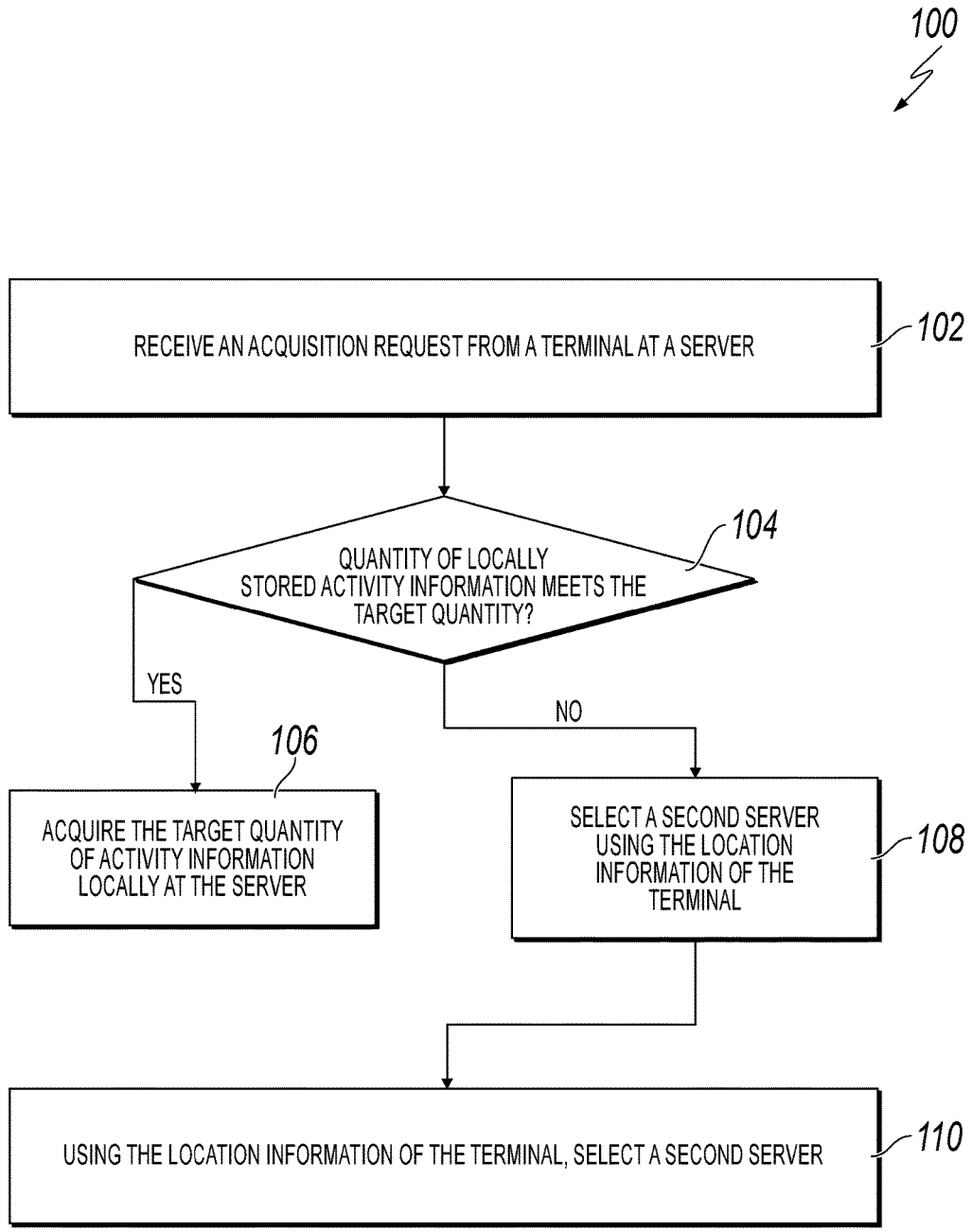
FIG. 1 is a flowchart illustrating an example of a computer-implemented information processing method, according to an implementation of the present disclosure.

The following detailed description describes the use of a server group for information processing, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

With the rapid development of Internet technologies, interaction in a digital electronic manner has become increasingly popular. During an interaction, for example, numerous users may access the same account simultaneously (such as, if the account is a popular account).

As an example, a merchant may establish, on a server, an activity account including multiple pieces of activity information. A user who needs to acquire activity information of the activity may send a request that is used for acquiring the activity information of the activity account. The request may be sent to the server through a terminal. The server may acquire one piece of activity information from the activity account, and then send the activity information to the terminal.

In a marketing business that distributes online monetary gift cards (for example, "red envelopes"), a merchant may establish, on a server, an activity account for distributing the red envelopes. The activity account may include multiple (for example, 10,000) red envelopes to be distributed, from which each user is to acquire one red envelope. During a transaction, a user may send a request used for acquiring the red envelope of the activity account. The server may acquire one red envelope from the activity account, and then send the red envelope to the terminal.

In conventional systems, multiple pieces of activity information of an activity account may be stored on one server. When numerous users send acquisition requests for acquiring the activity information of the activity account to the server simultaneously, the server may receive a large number of acquisition requests within a time period. The number of the acquisition requests received by the server within the time period can be greater than the number of acquisition requests that can be processed by the server within the time period. As a result, the server may only process some acquisition requests of the received acquisition requests within the time period, and response efficiency can be reduced. Other acquisition requests may only be processed later, such that a speed at which the server responds to other acquisition requests is reduced.

The described subject matter, however, permits numerous users to send the acquisition requests to the server simultaneously for acquiring activity information from the activity account. This is possible because multiple pieces of activity information of the activity account can be pre-stored on multiple servers, at different locations, such as in different cities. The multiple servers can share the acquisition requests sent by the numerous users. In this way, the number of the acquisition requests received by each server within the time period may be decreased. Also, the number of the acquisition requests received by each server within the time period may be less than the number of acquisition requests that can be processed by the server within the time period. Therefore, each server can complete processing of all respectively received processing requests within the time period. As a result, the speed of responding to the acquisition requests sent by the numerous users can be increased, and response efficiency can be improved.

FIG. 1 is a flowchart illustrating an example of a computer-implemented information processing method 100, according to an implementation of the present disclosure. Method 100 can be applied to a server that is one server in a server group, such as in an implementation in which the activity information is associated with red envelopes. Each server in the server group can be located at a different location, and each server can store activity information of an activity account. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, an acquisition request is received at a server from a terminal. The acquisition request for acquiring activity information of an activity account. The acquisition request includes location information of the terminal, an activity identifier of the activity account, and a target quantity of the activity information to be acquired. The server is one server in a server group, and each server in the server group is located at a different location. Each server separately stores activity information of the activity account. From 102, method 100 proceeds to 104.

At 104, a determination is made at the server whether a quantity of locally stored activity information of the activity account corresponding to the activity identifier meets the target quantity by being greater than, or equal to, the target quantity of the activity information to be acquired by the acquisition request. For example, the server that receives the acquisition request can determine if an amount of red envelopes is stored at the server. From 104, method 100 proceeds to 106.

At 106, the target quantity of activity information is locally acquired at the server when the quantity meets the target quantity, and the acquired target quantity of activity information is sent to the terminal. From 106, method 100 proceeds to 108.

At 108, using the location information of the terminal, a second server is selected when the quantity does not meet the target quantity, and the acquisition request is sent to the second server. The second server repeats, according to the acquisition request, the steps of receiving the request, determining whether a local quantity meets the target quantity, and locally acquiring the target quantity or selecting a third server. The third server that is selected is the server that is nearest, for example nearest based on geographic location, to the terminal from among other servers in the server group that did not receive the request. From 108, method 100 proceeds to 110.

At 110, the second server is selected using the location request. When the selected server receives the acquisition request, the selected server instantly acts as a server receiving a new acquisition request. At this time, the selected server can perform steps 102-108. After 110, method 100 stops.

Conventionally, multiple pieces of activity information of an activity account are merely stored on one server. When numerous users send acquisition requests for acquiring the activity information of the activity account to the server simultaneously, the server may receive a large number of acquisition requests within a time period. The number of the acquisition requests received by the server within the time period can easily be greater than the number of acquisition requests that can be processed by the server within the time period. As a result, the server can only process some acquisition requests in the received acquisition requests within the time period. Other acquisition requests may need to be processed later.

Conventionally, a server can process multiple (for example, 200) acquisition requests per second. When multiple (for example, 10,000) users located at respective locations all need to acquire activity information of an activity account, each user may send one acquisition request to the server, separately. The server receives the multiple acquisition requests within a time period, which may require a particular period of time (for example, 50 seconds) to complete processing of the received processing requests, thus prolonging a response time overall, and lowering the response efficiency.

However, in an example applicable to the present disclosure, 50 servers located at different locations, such as different geographic locations, can all store activity information of an activity account, and each server can process 200 acquisition requests per second. When 10,000 users located at different locations all need to acquire the activity information of the activity account, the 50 servers can share the 10,000 acquisition requests sent by the 10,000 users altogether. For example, each server can receive 200 acquisition requests. In this way, each server can complete processing of the respectively received processing requests in only one second, thus shortening a response time overall, and increasing the response efficiency.

In some implementations, selecting the server nearest to the terminal from the servers in the server group that have not received the acquisition request can be implemented by using the following steps. For example, the following steps can be used in an implementation of step 108.

First, a locally stored first correspondence between a server identifier, a database identifier, a database table identifier, an activity identifier, and server location information is acquired. Activity identifiers in all records in the first correspondence can include, for example, an activity identifier of the activity account and activity identifiers of other activity accounts.

Second, records including server identifiers of all servers that have not received the acquisition request are acquired from the first correspondence. This can be done to determine servers that can be used in further processing the request.

Third, records including an activity identifier are acquired from the first correspondence. For any record in the first correspondence, a determination is made as to whether an activity identifier included in the record is an activity identifier. If the activity identifier included in the record is the activity identifier, the record can be acquired. This step can be performed on each of the other records so as to acquire all records including the activity identifier from the first correspondence.

Fourth, server location information is separately acquired from each record including the activity identifier. For any acquired record including the activity identifier, the server location information in the record can be acquired. This step can be performed on each of other acquired records including the activity identifier, so as to separately acquire the server location information in each record including the activity identifier.

Fifth, location information of the server nearest to the location information of the terminal is selected from the acquired server location information. If location information of only one server is acquired in the fourth step of this process, then the acquired server location information can be used as the location information of the server nearest to the location information of the terminal. If location information of multiple servers is acquired in the fourth step of this process, then for the acquired location information of any server, a distance between the server location information and the location information of the terminal can be calculated. This step can be performed on the acquired location information of each of other servers. In this way, the server nearest to the location of the terminal can be selected according to the calculated distances.

Sixth, a record including the location information of the server nearest to the location of the terminal is determined from the first correspondence. For example, in the first correspondence, a first record can be acquired, and a determination is made whether the record includes the server location information selected in the fifth step of this process. When the record includes the server location information selected in the fifth step of this process, the first record can be used as the record including the location information of the server nearest to the location information of the terminal. When the record does not include the location information of the server nearest to the location information of the terminal, it can be determined that the record is not the record including the location information of the server nearest to the location information of the terminal. Then, a second record can be acquired, the step can be repeated until an acquired record includes the server location information selected in the fifth step of this process. The acquired record can be used as the record including the location information of the server nearest to the location information of the terminal.

Seventh, a server corresponding to a server identifier in the record including the location information of the server nearest to the location information of the terminal is used as a server nearest to the terminal. For example, when one piece of activity information is one red envelope, if the quantity of activity information to be acquired by the acquisition request is five, the quantity of to-be-acquired red envelopes is five. Assuming that the quantity of the latest acquired red envelopes stored on the server is merely three, the quantity three of the latest acquired red envelopes stored on the server is less than the quantity of five red envelopes to be acquired by the acquisition request. Therefore, it can be determined that the quantity of the latest acquired red envelopes stored on the server cannot satisfy the demand for the target quantity of the red envelopes to be acquired according to the acquisition request. As a result, only five red envelopes can be acquired from other servers and returned to the terminal.

Figure 2:
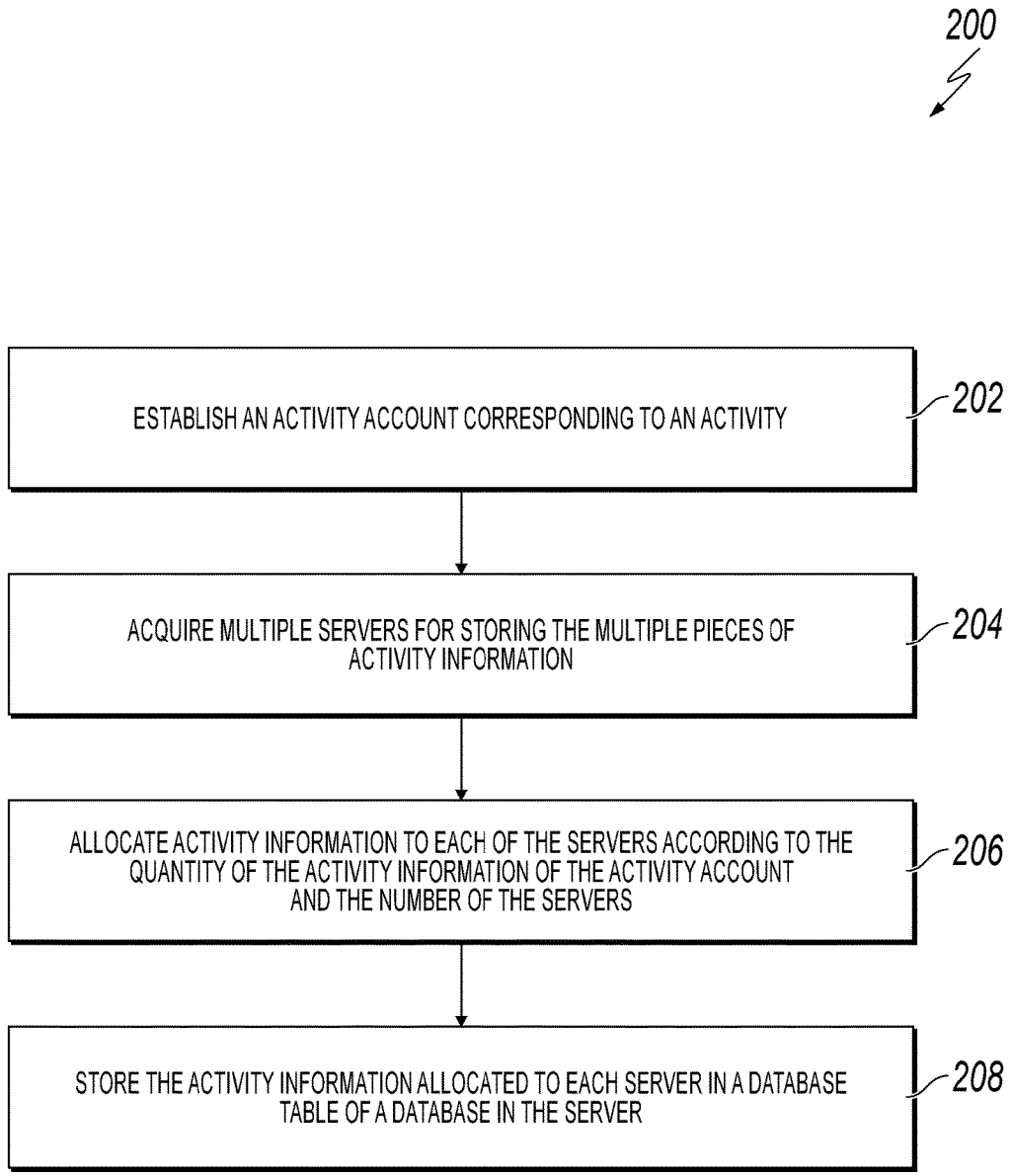
FIG. 2 is a flowchart illustrating an example of a computer-implemented information processing method, according to an implementation of the present disclosure.

FIG. 2 is a flowchart illustrating an example of a computer-implemented information processing method 200, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, an activity account corresponding to an activity is established. The activity account includes multiple pieces of activity information and an activity identifier of the activity account. The activity identifier can be, for example, a name or a number of the activity. The activity can be an activity of obtaining a red envelope, an activity of obtaining a commodity, or an activity of winning bonus points. For example, when the activity is the activity of obtaining a red envelope, each piece of the activity information can be a red envelope containing a certain amount, such as a five-yuan red envelope or a ten-yuan red envelope. When the activity is the activity of obtaining a commodity, each piece of the activity information may be the number of commodities limited in the purchase, such as one or two. From 202, method 200 proceeds to 204.

At 204, multiple servers for storing the multiple pieces of activity information are acquired, and location information of each of the servers is acquired. For example, a technical person can deploy servers at different locations, such as different geographic locations, in advance. The servers can mutually perform data communication, and each server can include a database and a database table for storing data such as activity information. The servers can all collectively correspond to one client terminal. When a user needs to log onto a background server corresponding to the client terminal, the client terminal can select a server nearest to the user for login. For example, the technical person can deploy one server in each city among Beijing, Shanghai, Guangzhou, Xining, Yinchuan, Kunming, and Harbin in advance, totaling seven servers. The seven servers can collectively correspond to one client terminal (such as "Tmall"). A user can install the client terminal Tmall on their mobile phone. When the user is in Beijing and needs to log into a background server of the client terminal Tmall, the client terminal Tmall can select a server nearest to the mobile phone of the user for login, that is, select a server located in Beijing.

In some implementations, selecting the server nearest to the terminal from servers in the server group that have not received the acquisition request can include the following steps.

First, a locally stored second correspondence between a server identifier, a database identifier, and an identifier of a database table storing no information is acquired. The deployed servers may mutually perform data communication. Therefore, for any deployed server, the server not only knows a local configuration situation of the server, but also knows configuration situations of all other servers, that is, whether a database table in a database of each server stores data. The server may locally establish, on the server, according to the local configuration of the server and the configuration of all other servers, a second correspondence between a server identifier, a database identifier, and an identifier of a database table.

Second, all server identifiers included in the second correspondence are acquired. Each record in the second correspondence is acquired, and the server identifier in each record is separately acquired to acquire all the server identifiers included in the second correspondence.

Third, a deletion operation is performed on identical server identifiers in all the acquired server identifiers, and only one of the identical server identifiers remains. Multiple server identifiers of all the acquired server identifiers can typically be identical server identifiers. Therefore, the deletion operation needs to be performed on the identical server identifiers, such that only one of the identical server identifiers remains. Of the remaining server identifiers, any two server identifiers are different.

Fourth, a server corresponding to each remaining server identifier is used as a server. From 204, method 200 proceeds to 206.

At 206, activity information is allocated to each of the servers according to the quantity of the activity information of the activity account and the number of the servers. The activity information may be evenly allocated to each of the servers according to the quantity of the activity information and the number of the servers.

For example, supposing that there are ten servers and 1000 pieces of activity information, 100 pieces of activity information can be allocated to each of the servers so as to evenly distribute the activity information to each of the servers. That is, a same quantity of information can be allocated to any two servers.

In another example, supposing that there are ten servers and 998 pieces of activity information, two servers can be selected from the ten servers, 99 pieces of activity information can be allocated to each of the selected two servers, and 100 pieces of information can be allocated to each of eight other non-selected servers. Thus, the quantities of the information allocated to any two servers can be the same or can have a difference of one.

In some implementations, greater quantities of pieces of activity information can be allocated to servers that have a higher degree of activity. For example, activity degrees of users in different regions can be analyzed according to a historical experience, and activity information of a different quantity can be allocated to a server at a different location, such as a different geographic location. In some implementations, allocation quantities can be determined based at least on analyzed historical information indicating per-server activity. For example, more pieces of activity information can be allocated to a server deployed in a region where the users have a high activity degree, and fewer pieces of activity information can be allocated to a server deployed in a region where the users have a low activity degree.

For example, assume that there are seven servers and they are separately located in Beijing, Shanghai, Guangzhou, Xining, Yinchuan, Kunming, and Harbin, where users in Beijing, Shanghai, and Guangzhou have a high activity degree, and users in Xining, Yinchuan, Kunming, and Harbin have a low activity degree. Greater quantities of pieces of activity information may be allocated to the servers in Beijing, Shanghai, and Guangzhou, and fewer pieces of activity information may be allocated to the servers in Xining, Yinchuan, Kunming, and Harbin, thus realizing reasonable allocation of the activity information. From 206, method 200 proceeds to 208.

At 208, for any server, the activity information allocated to the server is stored in a database table of a database on the server. This step can be performed on each of other servers. Specifically, for any server, a record including a server identifier of the server can be acquired from the second correspondence. A database identifier in the record can be used as a database identifier, and a database table identifier in the record can be used as a database table identifier. The activity information allocated to the server can be stored in the database table of the database on the server. The database can be a database corresponding to the database identifier, and the database table can be a database table corresponding to the database table identifier. After 208, method 200 stops.

Further, the record is deleted from the second correspondence. A server identifier of the server, the database identifier of the database, the database table identifier of the database table, an activity identifier of the activity account, and location information of the server are stored in a locally stored first correspondence between a server identifier, a database identifier, a database table identifier, an activity identifier, and server location information. This process can be repeated for each of other servers.

Figure 3:
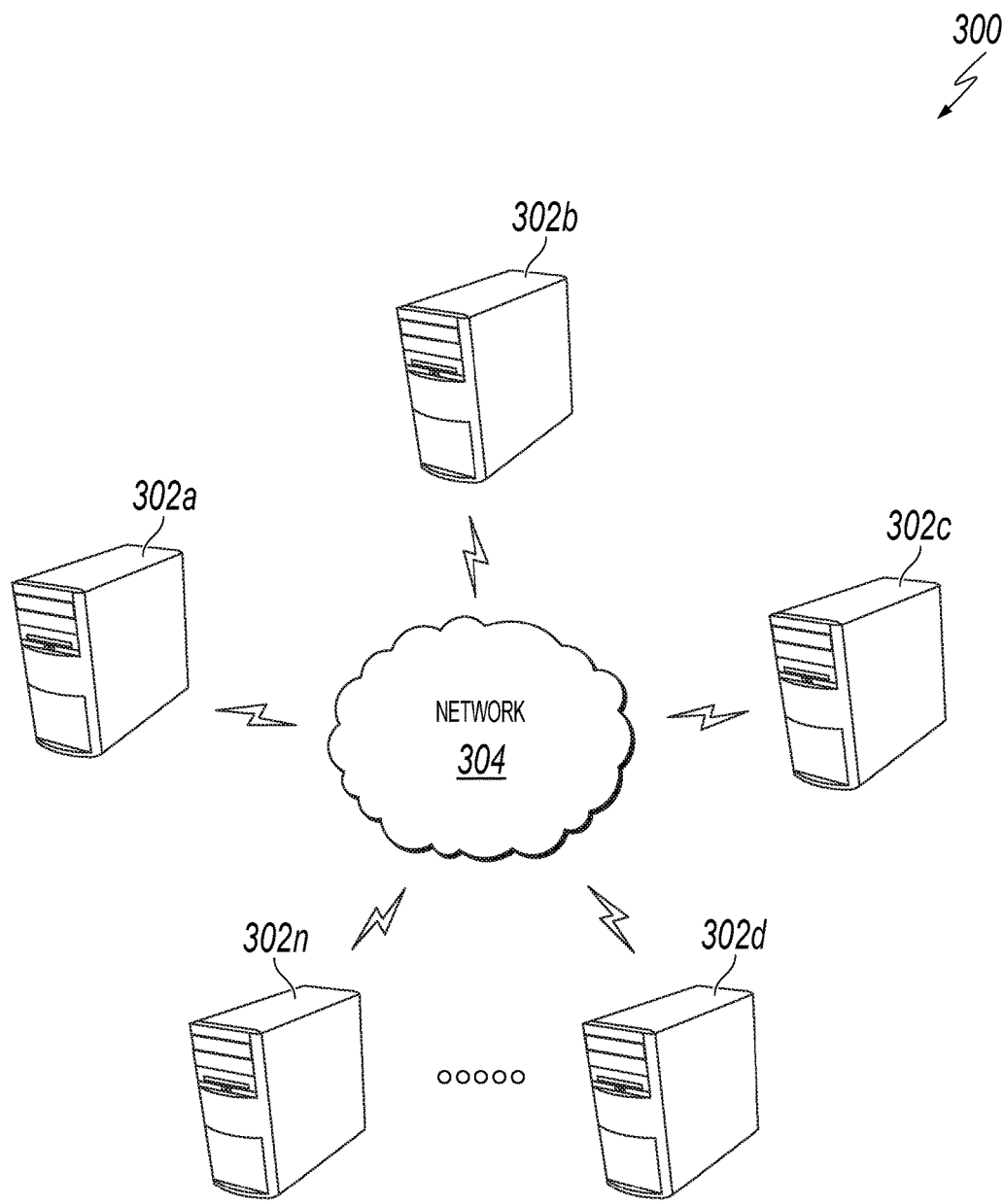
FIG. 3 is a block diagram illustrating an example of a scenario, according to an implementation of the present disclosure.

FIG. 3 is a block diagram illustrating an example of a scenario 300, according to an implementation of the present disclosure. For example, in the scenario 300, a server group includes the servers 302a-302n. Each server 302a-302n in the server group can be connected a network 304, such as (or including) the Internet. Thus, the servers 302a-302n in the server group may communicate with each other.

Using the servers 302a-302n, through a process from steps 202-208, multiple pieces of activity information of the activity account can be separately stored on multiple servers 302a-302n at different locations, such as different geographic locations. At the same time, an activity can be enabled immediately. Afterwards, users may acquire the activity information of the activity account. When the users need to acquire the activity information of the activity account, the server can distribute the activity information to be acquired by the users to the users through method 100. For example, each server in the server group can perform method 100. Each server in the server group can be located at a different location, such as a different geographic location.

The user can view an activity page of the activity on a terminal, and then the user can send the acquisition request used for acquiring the activity information of the activity account to the server by clicking or using other selection techniques. For example, the activity can be a distribution of red envelopes, and one piece of activity information can be one red envelope. The activity page displayed on the terminal can include a red envelope acquisition button and a red envelope acquisition quantity selection box. The user can select the target quantity of to-be-acquired red envelopes in the red envelope acquisition quantity selection box, and then click the acquisition button. After receiving a click operation of clicking the acquisition button by the user, the terminal can acquire the target quantity of the to-be-acquired red envelopes that is selected by the user in the red envelope acquisition quantity selection box, generate the acquisition request according to the target quantity, the location information of the terminal, and the activity identifier of the activity account, and send the acquisition request to the server.

Specifically, the database identifier and the database table identifier can be acquired from a record including location information of the server nearest to the location information of the terminal. A database table in a database corresponding to the acquired database identifier can be determined from the acquired server, where the database table is a database table corresponding to the acquired database table identifier. The quantity of activity information stored in the acquired database table can be acquired. A determination can be made whether the quantity of the activity information stored in the acquired database table is greater than, or equal to, the quantity of activity information to be acquired by the acquisition request.

The target quantity of activity information can be acquired from the acquired database table, and can then be sent to the terminal. If no activity information remains in the acquired database table at this time, that is, if the database table is empty at this time, a database table identifier of the acquired database table, a database identifier of a database to which the database table belongs, and a server identifier of a server to which the database having the database table belongs can be used to create a record. The record can be stored in the second correspondence. The record including the acquired database table identifier of the database table can be deleted from the first correspondence.

In an example, one piece of activity information can be one red envelope, the quantity of red envelopes to be acquired by the acquisition request can be five, and the quantity of red envelopes stored on the server receiving the acquisition request can be ten. At this time, the quantity of ten red envelopes stored on the server receiving the acquisition request is greater than the five red envelopes to be acquired by the acquisition request. Thus, it can be determined that the quantity of the red envelopes stored on the server receiving the acquisition request can satisfy the target quantity of the red envelopes to be acquired by the acquisition request. Five red envelopes can be selected from the ten red envelopes stored on the server receiving the acquisition request, and can be sent to the terminal. At this time, only five stored red envelopes remain on the server receiving the acquisition request. In this case, it can be determined that the quantity of the red envelopes stored on the server receiving the acquisition request cannot satisfy a demand for the target quantity of the red envelopes to be acquired by the acquisition request. In addition, in order to shorten a communication delay caused by the length of a communication link, a server nearest to the terminal can be selected from the servers in the server group that have not received the acquisition request. Then, the acquisition request can be sent to the selected server, such that the selected server receives the acquisition request and then determines whether the quantity of the locally stored activity information of the activity account is greater than, or equal to, the target quantity of the activity information to be acquired by the acquisition request.

Figure 4:
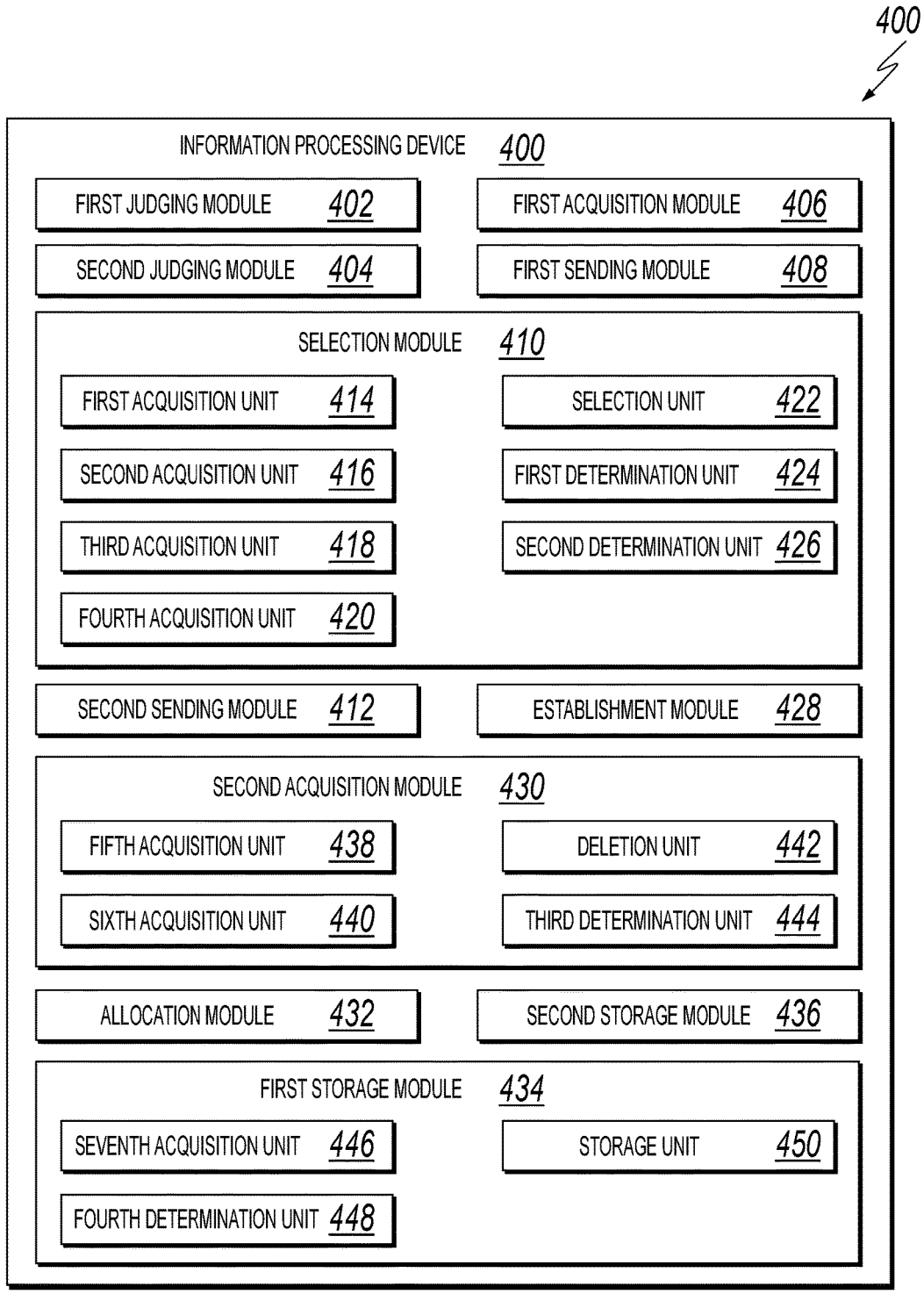
FIG. 4 is a block diagram illustrating an example of an information processing device, according to an implementation of the present disclosure.

FIG. 4 is a block diagram illustrating an example of an information processing device 400, according to an implementation of the present disclosure. In some implementations, the information processing device 400 can include at least the following components.

A first judging module 402 is configured to determine whether an acquisition request, used for acquiring activity information of an activity account and sent by a terminal, is received. A second judging module 404 is configured to determine, when the acquisition request is received, whether a quantity of locally stored activity information of the activity account corresponding to the activity identifier is greater than or equal to the target quantity of the activity information to be acquired by the acquisition request. A first acquisition module 406 is configured to locally acquire the target quantity of activity information when the quantity of the locally stored activity information is greater than or equal to the target quantity of the activity information to be acquired by the acquisition request. A first sending module 408 is configured to send the acquired target quantity of activity information to the terminal. A selection module 410 is configured to select, according to the location information of the terminal, a server nearest to the terminal from servers in the server group that have not received the acquisition request when the quantity of the locally stored activity information is less than the target quantity of the activity information to be acquired by the acquisition request. A second sending module 412 is configured to send the acquisition request to the selected server, such that the selected server performs, according to the acquisition request. The second sending module 412 is also configured to determine whether a quantity of locally stored activity information of the activity account is greater than or equal to the target quantity of the activity information to be acquired by the acquisition request.

Conventionally, multiple pieces of activity information of an activity account are merely stored in one server. When numerous users send acquisition requests for acquiring the activity information of the activity account to the server simultaneously, the server may receive a large number of acquisition requests within a time period. The number of the acquisition requests received by the server within the time period is easily greater than the number of acquisition requests that can be processed by the server within the time period. As a result, the server can only process some acquisition requests in the received acquisition requests within the time period, and other acquisition requests can only be processed later, such that a speed at which the server responds to other acquisition requests is reduced, and response efficiency is lowered.

The selection module 410 includes the following. A first acquisition unit 414 is configured to acquire a locally stored first correspondence between a server identifier, a database identifier, a database table identifier, an activity identifier, and server location information. A second acquisition unit 416 is configured to acquire, from the first correspondence, records including server identifiers of all the servers that have not received the acquisition request. A third acquisition unit 418 is configured to acquire records including the activity identifier from the records including the server identifiers of all the servers that have not received the acquisition request. A fourth acquisition unit 420 is configured to separately acquire server location information from each record including the activity identifier. A selection unit 422 is configured to select location information of the server nearest to the location information of the terminal from the acquired server location information. A first determination unit 424 is configured to determine, from the first correspondence, a record including the location information of the server nearest to the location information of the terminal. A second determination unit 426 is configured to use a server corresponding to a server identifier in the record including the location information of the server nearest to the location information of the terminal as the server nearest to the terminal.

Further, the information processing device 400 further includes the following. An establishment module 428 is configured to establish an activity account, where the activity account includes multiple pieces of activity information and an activity identifier of the activity account. A second acquisition module 430 is configured to acquire multiple servers for storing the multiple pieces of activity information, and acquire location information of each of the servers. An allocation module 432 is configured to allocate activity information to each of the servers according to the quantity of the activity information of the activity account and the number of the servers. A first storage module 434 is configured to store, for each of the servers, the activity information allocated to the server into a database table of a database in the server. A second storage module 436 is configured to store a server identifier of the server, a database identifier of the database, a database table identifier of the database table, the activity identifier of the activity account, and the location information of the server into a locally stored first correspondence between a server identifier, a database identifier, a database table identifier, an activity identifier, and server location information.

The second acquisition module 430 includes the following. A fifth acquisition unit 438 is configured to acquire a locally stored second correspondence between a server identifier, a database identifier, and an identifier of a database table storing no information. A sixth acquisition unit 440 is configured to acquire all server identifiers included in the second correspondence. A deletion unit 442 is configured to perform a deletion operation on identical server identifiers in all the acquired server identifiers, and keeping only one of the identical server identifiers. A third determination unit 444 is configured to use all servers corresponding to the remaining server identifiers as the servers.

The first storage module 434 includes the following. A seventh acquisition unit 446 is configured to acquire a record including the server from the second correspondence. A fourth determination unit 448 is configured to use a database identifier in the record as a database identifier, and use a database table identifier in the record as a database table identifier. A storage unit 450 is configured to store the activity information allocated to the server into a database table of a database in the server, where the database is a database corresponding to the database identifier, and the database table is a database table corresponding to the database table identifier.

Figure 5:
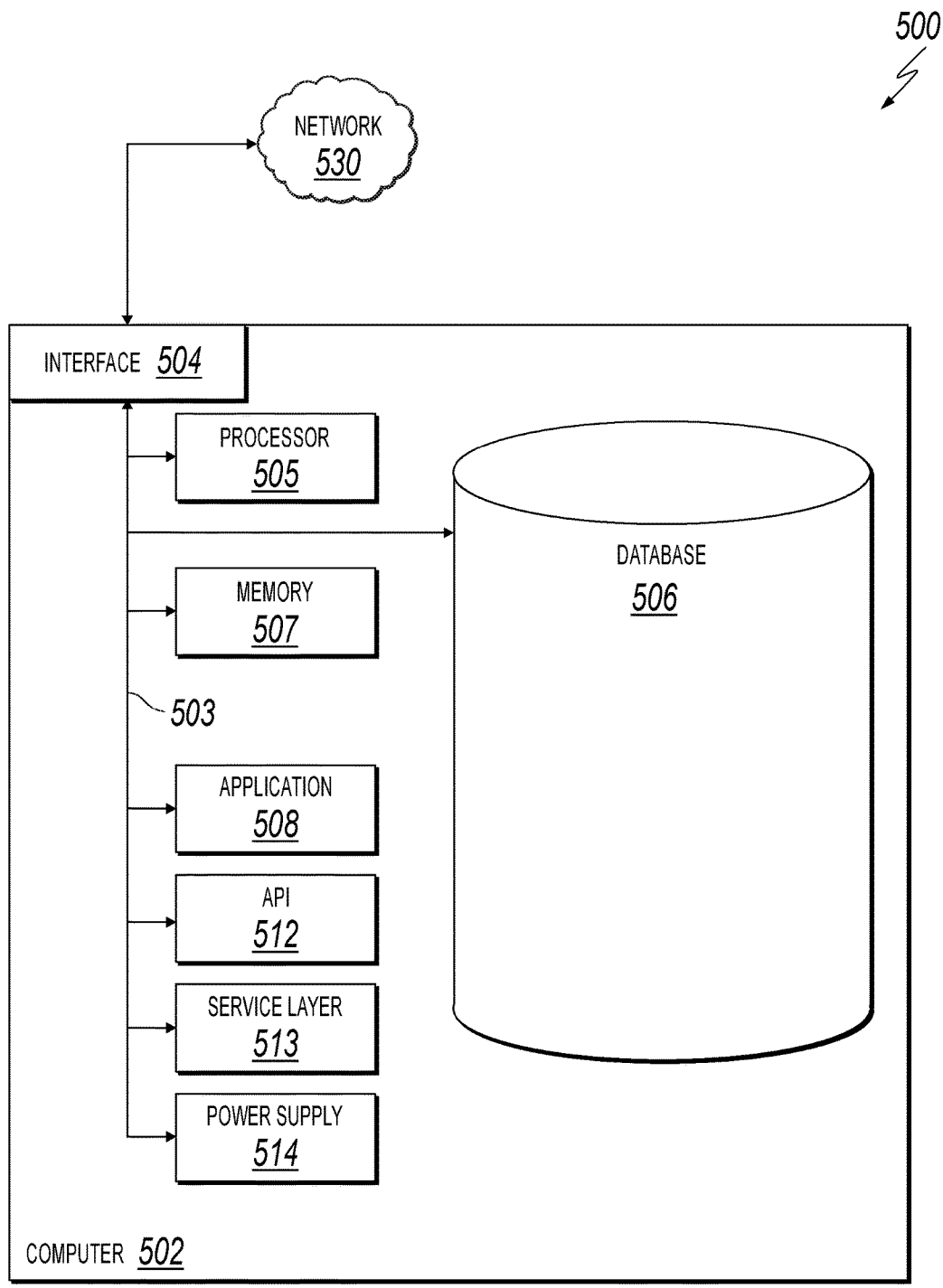
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented system 500 used to provide computational functionalities associated with described algorithms, methods, functions, processes, flows, and procedures, according to an implementation of the present disclosure. In the illustrated implementation, system 500 includes a computer 502 and a network 530.

The illustrated computer 502 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 502 can include an input device, such as a keypad, keyboard, touch screen, another input device, or a combination of input devices that can accept user information, and an output device that conveys information associated with the operation of the computer 502, including digital data, visual, audio, another type of information, or a combination of types of information, on a graphical-type user interface (UI) (or GUI) or other UI.

The computer 502 can serve in a role in a distributed computing system as a client, network component, a server, a database or another persistency, another role, or a combination of roles for performing the subject matter described in the present disclosure. The illustrated computer 502 is communicably coupled with a network 530. In some implementations, one or more components of the computer 502 can be configured to operate within an environment, including cloud-computing-based, local, global, another environment, or a combination of environments.

At a high level, the computer 502 is an electronic computing device operable to receive, transmit, process, store, or manage data and information associated with the described subject matter. According to some implementations, the computer 502 can also include or be communicably coupled with a server, including an application server, e-mail server, web server, caching server, streaming data server, another server, or a combination of servers.

The computer 502 can receive requests over network 530 (for example, from a client software application executing on another computer 502) and respond to the received requests by processing the received requests using a software application or a combination of software applications. In addition, requests can also be sent to the computer 502 from internal users (for example, from a command console or by another internal access method), external or third-parties, or other entities, individuals, systems, or computers.

Each of the components of the computer 502 can communicate using a system bus 503. In some implementations, any or all of the components of the computer 502, including hardware, software, or a combination of hardware and software, can interface over the system bus 503 using an application programming interface (API) 512, a service layer 513, or a combination of the API 512 and service layer 513. The API 512 can include specifications for routines, data structures, and object classes. The API 512 can be either computer-language independent or dependent and refer to a complete interface, a single function, or even a set of APIs. The service layer 513 provides software services to the computer 502 or other components (whether illustrated or not) that are communicably coupled to the computer 502. The functionality of the computer 502 can be accessible for all service consumers using this service layer. Software services, such as those provided by the service layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 502, alternative implementations can illustrate the API 512 or the service layer 513 as stand-alone components in relation to other components of the computer 502 or other components (whether illustrated or not) that are communicably coupled to the computer 502. Moreover, any or all parts of the API 512 or the service layer 513 can be implemented as a child or a sub-module of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502. The interface 504 is used by the computer 502 for communicating with another computing system (whether illustrated or not) that is communicatively linked to the network 530 in a distributed environment. Generally, the interface 504 is operable to communicate with the network 530 and includes logic encoded in software, hardware, or a combination of software and hardware. More specifically, the interface 504 can include software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors can be used according to particular needs, desires, or particular implementations of the computer 502. Generally, the processor 505 executes instructions and manipulates data to perform the operations of the computer 502 and any algorithms, methods, functions, processes, flows, and procedures as described in the present disclosure.

The computer 502 also includes a database 506 that can hold data for the computer 502, another component communicatively linked to the network 530 (whether illustrated or not), or a combination of the computer 502 and another component. For example, database 506 can be an in-memory, conventional, or another type of database storing data consistent with the present disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases of similar or differing types can be used according to particular needs, desires, or particular implementations of the computer 502 and the described functionality. While database 506 is illustrated as an integral component of the computer 502, in alternative implementations, database 506 can be external to the computer 502.

The computer 502 also includes a memory 507 that can hold data for the computer 502, another component or components communicatively linked to the network 530 (whether illustrated or not), or a combination of the computer 502 and another component. Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 or similar or differing types can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in the present disclosure. For example, application 508 can serve as one or more components, modules, or applications. Further, although illustrated as a single application 508, the application 508 can be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or another power management functionality). In some implementations, the power-supply 514 can include a power plug to allow the computer 502 to be plugged into a wall socket or another power source to, for example, power the computer 502 or recharge a rechargeable battery.

There can be any number of computers 502 associated with, or external to, a computer system containing computer 502, each computer 502 communicating over network 530. Further, the term "client," "user," or other appropriate terminology can be used interchangeably, as appropriate, without departing from the scope of the present disclosure. Moreover, the present disclosure contemplates that many users can use one computer 502, or that one user can use multiple computers 502.

Described implementations of the subject matter can include one or more features, alone or in combination.

For example, in a first implementation, a method comprises: receiving, at a server and from a terminal, an acquisition request for acquiring activity information of an activity account, wherein the acquisition request includes location information of the terminal, an activity identifier of the activity account, and a target quantity of the activity information to be acquired, wherein the server is one server in a server group, and wherein each server in the server group is located at a different location and separately stores activity information of the activity account; determining, at the server, whether a quantity of locally stored activity information of the activity account corresponding to the activity identifier meets the target quantity by being greater than or equal to the target quantity of the activity information to be acquired by the acquisition request; locally acquiring the target quantity of activity information at the server when the quantity meets the target quantity, and sending the acquired target quantity of activity information to the terminal; and selecting, using the location information of the terminal, a second server when the quantity does not meet the target quantity, and sending the acquisition request to the second server, such that the second server repeats, according to the acquisition request, the steps of receiving the request, determining whether a local quantity meets the target quantity, and locally acquiring the target quantity or selecting a third server, wherein the second server is nearest to the terminal from among other servers in the server group that did not receive the request.

The foregoing and other described implementations can each, optionally, include one or more of the following features:

A first feature, combinable with any of the following features, selecting the second server comprises: acquiring a locally stored first correspondence between a server identifier, a database identifier, a database table identifier, an activity identifier, and server location information; acquiring, from the first correspondence, records comprising server identifiers of all the servers that did not receive the acquisition request; acquiring records comprising the activity identifier from the records comprising server identifiers of all the servers that did not received the acquisition request; separately acquiring server location information from each record comprising the activity identifier; selecting location information of the server nearest to the location information of the terminal from the acquired server location information; determining, from the first correspondence, a record comprising the location information of the server nearest to the location information of the terminal; and using a server corresponding to a server identifier in the record comprising the location information of the server nearest to the location information of the terminal as the second server.

A second feature, combinable with any of the previous or following features, the method further comprises: establishing the activity account, wherein the activity account comprises multiple pieces of activity information and the activity identifier of the activity account; acquiring multiple servers for storing multiple pieces of activity information, and acquiring location information of each of the multiple servers; allocating activity information to each of the multiple servers according to the quantity of the activity information of the activity account and the number of the multiple servers; and storing, for each individual server of the multiple servers, the activity information allocated to the individual server into a database table of a database of the individual server; and storing a server identifier of the individual server, a database identifier of the database, a database table identifier of the database table, the activity identifier of the activity account, and the location information of the individual server into a locally stored first correspondence between a server identifier, a database identifier, a database table identifier, an activity identifier, and server location information.

A third feature, combinable with any of the previous or following features, acquiring multiple servers for storing the multiple pieces of activity information comprises: acquiring a locally stored second correspondence between a server identifier, a database identifier, and an identifier of a database table storing no information; acquiring all server identifiers comprised in the second correspondence; performing a deletion operation on identical server identifiers in all the acquired server identifiers, and keeping only one of the identical server identifiers; and using all servers corresponding to the remaining server identifiers as the servers.

A fourth feature, combinable with any of the previous or following features, storing the activity information allocated to the individual server into a database table of a database of the server comprises: acquiring a record comprising the individual server from the second correspondence; using a database identifier in the record as a database identifier, and using a database table identifier in the record as a database table identifier; and storing the activity information allocated to the individual server into a database table of a database in the individual server, wherein the database is a database corresponding to the database identifier, and the database table corresponds to the database table identifier.

A fifth feature, combinable with any of the previous or following features, the method further comprises allocating greater quantities of pieces of activity information to servers that have a higher degree of activity.

A sixth feature, combinable with any of the previous or following features, allocation quantities are determined based at least on analyzed historical information indicating per-server activity.

In a second implementation, non-transitory, computer-readable medium storing one or more instructions executable by a computer system to perform operations comprising: receiving, at a server and from a terminal, an acquisition request for acquiring activity information of an activity account, wherein the acquisition request includes location information of the terminal, an activity identifier of the activity account, and a target quantity of the activity information to be acquired, wherein the server is one server in a server group, and wherein each server in the server group is located at a different location and separately stores activity information of the activity account; determining, at the server, whether a quantity of locally stored activity information of the activity account corresponding to the activity identifier meets the target quantity by being greater than or equal to the target quantity of the activity information to be acquired by the acquisition request; locally acquiring the target quantity of activity information at the server when the quantity meets the target quantity, and sending the acquired target quantity of activity information to the terminal; and selecting, using the location information of the terminal, a second server when the quantity does not meet the target quantity, and sending the acquisition request to the second server, such that the second server repeats, according to the acquisition request, the steps of receiving the request, determining whether a local quantity meets the target quantity, and locally acquiring the target quantity or selecting a third server, wherein the second server is nearest to the terminal from among other servers in the server group that did not receive the request.

The foregoing and other described implementations can each, optionally, include one or more of the following features:

A first feature, combinable with any of the following features, selecting the second server comprises: acquiring a locally stored first correspondence between a server identifier, a database identifier, a database table identifier, an activity identifier, and server location information; acquiring, from the first correspondence, records comprising server identifiers of all the servers that did not receive the acquisition request; acquiring records comprising the activity identifier from the records comprising server identifiers of all the servers that did not received the acquisition request; separately acquiring server location information from each record comprising the activity identifier; selecting location information of the server nearest to the location information of the terminal from the acquired server location information; determining, from the first correspondence, a record comprising the location information of the server nearest to the location information of the terminal; and using a server corresponding to a server identifier in the record comprising the location information of the server nearest to the location information of the terminal as the second server.

A second feature, combinable with any of the previous or following features, the operations further comprises: establishing the activity account, wherein the activity account comprises multiple pieces of activity information and the activity identifier of the activity account; acquiring multiple servers for storing multiple pieces of activity information, and acquiring location information of each of the multiple servers; allocating activity information to each of the multiple servers according to the quantity of the activity information of the activity account and the number of the multiple servers; and storing, for each individual server of the multiple servers, the activity information allocated to the individual server into a database table of a database of the individual server; and storing a server identifier of the individual server, a database identifier of the database, a database table identifier of the database table, the activity identifier of the activity account, and the location information of the individual server into a locally stored first correspondence between a server identifier, a database identifier, a database table identifier, an activity identifier, and server location information.

A third feature, combinable with any of the previous or following features, acquiring multiple servers for storing the multiple pieces of activity information comprises: acquiring a locally stored second correspondence between a server identifier, a database identifier, and an identifier of a database table storing no information; acquiring all server identifiers comprised in the second correspondence; performing a deletion operation on identical server identifiers in all the acquired server identifiers, and keeping only one of the identical server identifiers; and using all servers corresponding to the remaining server identifiers as the servers.

A fourth feature, combinable with any of the previous or following features, storing the activity information allocated to the individual server into a database table of a database of the server comprises: acquiring a record comprising the individual server from the second correspondence; using a database identifier in the record as a database identifier, and using a database table identifier in the record as a database table identifier; and storing the activity information allocated to the individual server into a database table of a database in the individual server, wherein the database is a database corresponding to the database identifier, and the database table corresponds to the database table identifier.

A fifth feature, combinable with any of the previous or following features, the operations further comprises allocating greater quantities of pieces of activity information to servers that have a higher degree of activity.

A sixth feature, combinable with any of the previous or following features, allocation quantities are determined based at least on analyzed historical information indicating per-server activity.

In a third implementation, a computer-implemented system, comprises one or more computers and one or more computer memory devices interoperably coupled with the one or more computers and having tangible, non-transitory, machine-readable media storing one or more instructions that, when executed by the one or more computers, perform one or more operations comprising: receiving, at a server and from a terminal, an acquisition request for acquiring activity information of an activity account, wherein the acquisition request includes location information of the terminal, an activity identifier of the activity account, and a target quantity of the activity information to be acquired, wherein the server is one server in a server group, and wherein each server in the server group is located at a different location and separately stores activity information of the activity account; determining, at the server, whether a quantity of locally stored activity information of the activity account corresponding to the activity identifier meets the target quantity by being greater than or equal to the target quantity of the activity information to be acquired by the acquisition request; locally acquiring the target quantity of activity information at the server when the quantity meets the target quantity, and sending the acquired target quantity of activity information to the terminal; and selecting, using the location information of the terminal, a second server when the quantity does not meet the target quantity, and sending the acquisition request to the second server, such that the second server repeats, according to the acquisition request, the steps of receiving the request, determining whether a local quantity meets the target quantity, and locally acquiring the target quantity or selecting a third server, wherein the second server is nearest to the terminal from among other servers in the server group that did not receive the request.

The foregoing and other described implementations can each, optionally, include one or more of the following features:

A first feature, combinable with any of the following features, selecting the second server comprises: acquiring a locally stored first correspondence between a server identifier, a database identifier, a database table identifier, an activity identifier, and server location information; acquiring, from the first correspondence, records comprising server identifiers of all the servers that did not receive the acquisition request; acquiring records comprising the activity identifier from the records comprising server identifiers of all the servers that did not received the acquisition request; separately acquiring server location information from each record comprising the activity identifier; selecting location information of the server nearest to the location information of the terminal from the acquired server location information; determining, from the first correspondence, a record comprising the location information of the server nearest to the location information of the terminal; and using a server corresponding to a server identifier in the record comprising the location information of the server nearest to the location information of the terminal as the second server.

A second feature, combinable with any of the previous or following features, the operations further comprises: establishing the activity account, wherein the activity account comprises multiple pieces of activity information and the activity identifier of the activity account; acquiring multiple servers for storing multiple pieces of activity information, and acquiring location information of each of the multiple servers; allocating activity information to each of the multiple servers according to the quantity of the activity information of the activity account and the number of the multiple servers; and storing, for each individual server of the multiple servers, the activity information allocated to the individual server into a database table of a database of the individual server; and storing a server identifier of the individual server, a database identifier of the database, a database table identifier of the database table, the activity identifier of the activity account, and the location information of the individual server into a locally stored first correspondence between a server identifier, a database identifier, a database table identifier, an activity identifier, and server location information.

A third feature, combinable with any of the previous or following features, acquiring multiple servers for storing the multiple pieces of activity information comprises: acquiring a locally stored second correspondence between a server identifier, a database identifier, and an identifier of a database table storing no information; acquiring all server identifiers comprised in the second correspondence; performing a deletion operation on identical server identifiers in all the acquired server identifiers, and keeping only one of the identical server identifiers; and using all servers corresponding to the remaining server identifiers as the servers.

A fourth feature, combinable with any of the previous or following features, storing the activity information allocated to the individual server into a database table of a database of the server comprises: acquiring a record comprising the individual server from the second correspondence; using a database identifier in the record as a database identifier, and using a database table identifier in the record as a database table identifier; and storing the activity information allocated to the individual server into a database table of a database in the individual server, wherein the database is a database corresponding to the database identifier, and the database table corresponds to the database table identifier.

A fifth feature, combinable with any of the previous or following features, the operations further comprises allocating greater quantities of pieces of activity information to servers that have a higher degree of activity.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, at a server and from a terminal, an acquisition request for acquiring activity information of an activity account, wherein the acquisition request includes location information of the terminal, an activity identifier of the activity account, and a target quantity of the activity information to be acquired, wherein the server is one server in a server group, and wherein each server in the server group is located at a different location and separately stores activity information of the activity account;
   determining, at the server, whether a quantity of locally stored activity information of the activity account corresponding to the activity identifier meets the target quantity by being greater than or equal to the target quantity of the activity information to be acquired by the acquisition request;
   locally acquiring the target quantity of activity information at the server when the quantity meets the target quantity, and sending the acquired target quantity of activity information to the terminal; and
   selecting, using the location information of the terminal, a second server when the quantity does not meet the target quantity, and sending the acquisition request to the second server, such that the second server repeats, according to the acquisition request, the steps of receiving the request, determining whether a local quantity meets the target quantity, and locally acquiring the target quantity or selecting a third server, wherein the second server is nearest to the terminal from among other servers in the server group that did not receive the request.

2. The computer-implemented method of claim 1, wherein selecting the second server comprises:
   acquiring a locally stored first correspondence between a server identifier, a database identifier, a database table identifier, an activity identifier, and server location information;
   acquiring, from the first correspondence, records comprising server identifiers of all the servers that did not receive the acquisition request;
   acquiring records comprising the activity identifier from the records comprising server identifiers of all the servers that did not received the acquisition request;
   separately acquiring server location information from each record comprising the activity identifier;
   selecting location information of the server nearest to the location information of the terminal from the acquired server location information;
   determining, from the first correspondence, a record comprising the location information of the server nearest to the location information of the terminal; and
   using a server corresponding to a server identifier in the record comprising the location information of the server nearest to the location information of the terminal as the second server.

3. The computer-implemented method of claim 1, further comprising:
   establishing the activity account, wherein the activity account comprises multiple pieces of activity information and the activity identifier of the activity account;
   acquiring multiple servers for storing multiple pieces of activity information, and acquiring location information of each of the multiple servers;
   allocating activity information to each of the multiple servers according to the quantity of the activity information of the activity account and the number of the multiple servers; and
   storing, for each individual server of the multiple servers, the activity information allocated to the individual server into a database table of a database of the individual server; and storing a server identifier of the individual server, a database identifier of the database, a database table identifier of the database table, the activity identifier of the activity account, and the location information of the individual server into a locally stored first correspondence between a server identifier, a database identifier, a database table identifier, an activity identifier, and server location information.

4. The computer-implemented method of claim 3, wherein acquiring multiple servers for storing the multiple pieces of activity information comprises:
   acquiring a locally stored second correspondence between a server identifier, a database identifier, and an identifier of a database table storing no information;
   acquiring all server identifiers comprised in the second correspondence;
   performing a deletion operation on identical server identifiers in all the acquired server identifiers, and keeping only one of the identical server identifiers; and
   using all servers corresponding to the remaining server identifiers as the servers.

5. The computer-implemented method of claim 4, wherein storing the activity information allocated to the individual server into a database table of a database of the server comprises:

acquiring a record comprising the individual server from the second correspondence;

using a database identifier in the record as a database identifier, and using a database table identifier in the record as a database table identifier; and storing the activity information allocated to the individual server into a database table of a database in the individual server, wherein the database is a database corresponding to the database identifier, and the database table corresponds to the database table identifier.

6. The computer-implemented method of claim 1, further comprising allocating greater quantities of pieces of activity information to servers that have a higher degree of activity.

7. The computer-implemented method of claim 6, wherein allocation quantities are determined based at least on analyzed historical information indicating per-server activity.

8. A non-transitory, computer-readable medium storing one or more instructions executable by a computer system to perform operations comprising:

receiving, at a server and from a terminal, an acquisition request for acquiring activity information of an activity account, wherein the acquisition request includes location information of the terminal, an activity identifier of the activity account, and a target quantity of the activity information to be acquired, wherein the server is one server in a server group, and wherein each server in the server group is located at a different location and separately stores activity information of the activity account;

determining, at the server, whether a quantity of locally stored activity information of the activity account corresponding to the activity identifier meets the target quantity by being greater than or equal to the target quantity of the activity information to be acquired by the acquisition request;

locally acquiring the target quantity of activity information at the server when the quantity meets the target quantity, and sending the acquired target quantity of activity information to the terminal; and selecting, using the location information of the terminal, a second server when the quantity does not meet the target quantity, and sending the acquisition request to the second server, such that the second server repeats, according to the acquisition request, the steps of receiving the request, determining whether a local quantity meets the target quantity, and locally acquiring the target quantity or selecting a third server, wherein the second server is nearest to the terminal from among other servers in the server group that did not receive the request.

9. The non-transitory, computer-readable medium of claim 8, wherein selecting the second server comprises:

acquiring a locally stored first correspondence between a server identifier, a database identifier, a database table identifier, an activity identifier, and server location information;

acquiring, from the first correspondence, records comprising server identifiers of all the servers that did not receive the acquisition request;

acquiring records comprising the activity identifier from the records comprising server identifiers of all the servers that did not received the acquisition request;

separately acquiring server location information from each record comprising the activity identifier;

selecting location information of the server nearest to the location information of the terminal from the acquired server location information;

determining, from the first correspondence, a record comprising the location information of the server nearest to the location information of the terminal; and using a server corresponding to a server identifier in the record comprising the location information of the server nearest to the location information of the terminal as the second server.

10. The non-transitory, computer-readable medium of claim 8, the operations further comprising:

establishing the activity account, wherein the activity account comprises multiple pieces of activity information and the activity identifier of the activity account;

acquiring multiple servers for storing multiple pieces of activity information, and acquiring location information of each of the multiple servers;

allocating activity information to each of the multiple servers according to the quantity of the activity information of the activity account and the number of the multiple servers; and storing, for each individual server of the multiple servers, the activity information allocated to the individual server into a database table of a database of the individual server; and storing a server identifier of the individual server, a database identifier of the database, a database table identifier of the database table, the activity identifier of the activity account, and the location information of the individual server into a locally stored first correspondence between a server identifier, a database identifier, a database table identifier, an activity identifier, and server location information.

11. The non-transitory, computer-readable medium of claim 10, wherein acquiring multiple servers for storing the multiple pieces of activity information comprises:

acquiring a locally stored second correspondence between a server identifier, a database identifier, and an identifier of a database table storing no information;

acquiring all server identifiers comprised in the second correspondence;

performing a deletion operation on identical server identifiers in all the acquired server identifiers, and keeping only one of the identical server identifiers; and using all servers corresponding to the remaining server identifiers as the servers.

12. The non-transitory, computer-readable medium of claim 11, wherein storing the activity information allocated to the individual server into a database table of a database of the server comprises:

acquiring a record comprising the individual server from the second correspondence;

using a database identifier in the record as a database identifier, and using a database table identifier in the record as a database table identifier; and storing the activity information allocated to the individual server into a database table of a database in the individual server, wherein the database is a database corresponding to the database identifier, and the database table corresponds to the database table identifier.

13. The non-transitory, computer-readable medium of claim 8, the operations further comprising allocating greater quantities of pieces of activity information to servers that have a higher degree of activity.

14. The non-transitory, computer-readable medium of claim 13, wherein allocation quantities are determined based at least on analyzed historical information indicating per-server activity.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at a server and from a terminal, an acquisition request for acquiring activity information of an activity account, wherein the acquisition request includes location information of the terminal, an activity identifier of the activity account, and a target quantity of the activity information to be acquired, wherein the server is one server in a server group, and wherein each server in the server group is located at a different location and separately stores activity information of the activity account;
determining, at the server, whether a quantity of locally stored activity information of the activity account corresponding to the activity identifier meets the target quantity by being greater than or equal to the target quantity of the activity information to be acquired by the acquisition request;
locally acquiring the target quantity of activity information at the server when the quantity meets the target quantity, and sending the acquired target quantity of activity information to the terminal; and
selecting, using the location information of the terminal, a second server when the quantity does not meet the target quantity, and sending the acquisition request to the second server, such that the second server repeats, according to the acquisition request, the steps of receiving the request, determining whether a local quantity meets the target quantity, and locally acquiring the target quantity or selecting a third server, wherein the second server is nearest to the terminal from among other servers in the server group that did not receive the request.

16. The computer-implemented system of claim 15, wherein selecting the second server comprises:
acquiring a locally stored first correspondence between a server identifier, a database identifier, a database table identifier, an activity identifier, and server location information;
acquiring, from the first correspondence, records comprising server identifiers of all the servers that did not receive the acquisition request;
acquiring records comprising the activity identifier from the records comprising server identifiers of all the servers that did not received the acquisition request;
separately acquiring server location information from each record comprising the activity identifier;
selecting location information of the server nearest to the location information of the terminal from the acquired server location information;
determining, from the first correspondence, a record comprising the location information of the server nearest to the location information of the terminal; and
using a server corresponding to a server identifier in the record comprising the location information of the server nearest to the location information of the terminal as the second server.

17. The computer-implemented system of claim 15, the operations further comprising:
establishing the activity account, wherein the activity account comprises multiple pieces of activity information and the activity identifier of the activity account;
acquiring multiple servers for storing multiple pieces of activity information, and acquiring location information of each of the multiple servers;
allocating activity information to each of the multiple servers according to the quantity of the activity information of the activity account and the number of the multiple servers; and
storing, for each individual server of the multiple servers, the activity information allocated to the individual server into a database table of a database of the individual server; and storing a server identifier of the individual server, a database identifier of the database, a database table identifier of the database table, the activity identifier of the activity account, and the location information of the individual server into a locally stored first correspondence between a server identifier, a database identifier, a database table identifier, an activity identifier, and server location information.

18. The computer-implemented system of claim 17, wherein acquiring multiple servers for storing the multiple pieces of activity information comprises:
acquiring a locally stored second correspondence between a server identifier, a database identifier, and an identifier of a database table storing no information;
acquiring all server identifiers comprised in the second correspondence;
performing a deletion operation on identical server identifiers in all the acquired server identifiers, and keeping only one of the identical server identifiers; and
using all servers corresponding to the remaining server identifiers as the servers.

19. The computer-implemented system of claim 18, wherein storing the activity information allocated to the individual server into a database table of a database of the server comprises:
acquiring a record comprising the individual server from the second correspondence;
using a database identifier in the record as a database identifier, and using a database table identifier in the record as a database table identifier; and
storing the activity information allocated to the individual server into a database table of a database in the individual server, wherein the database is a database corresponding to the database identifier, and the database table corresponds to the database table identifier.

20. The computer-implemented system of claim 15, the operations further comprising allocating greater quantities of pieces of activity information to servers that have a higher degree of activity.

* * * * *